United States Patent [19]

Nishioka et al.

[11] Patent Number: 5,193,385
[45] Date of Patent: Mar. 16, 1993

[54] CANTILEVER FOR USE IN ATOMIC FORCE MICROSCOPE AND MANUFACTURING METHOD THEREFOR

[75] Inventors: Tadashi Nishioka; Takao Yasue; Hiroshi Koyama, all of Itami, Japan

[73] Assignee: Mitsubishi Denki Kabushiki Kaisha, Tokyo, Japan

[21] Appl. No.: 685,644

[22] Filed: Apr. 16, 1991

[30] Foreign Application Priority Data

Aug. 28, 1990 [JP] Japan ................. 2-224473

[51] Int. Cl.$^5$ ..................... G01B 5/28; G01N 23/00
[52] U.S. Cl. ..................... 73/105; 250/306; 250/307
[58] Field of Search ................. 73/105; 250/306, 307

[56] References Cited

U.S. PATENT DOCUMENTS

| | | | |
|---|---|---|---|
| 4,340,954 | 7/1982 | Chio et al. | 369/173 |
| 4,669,300 | 6/1987 | Hall et al. | 73/105 |
| 4,724,318 | 2/1988 | Binning | . |
| 4,837,445 | 6/1989 | Nishioka et al. | 250/306 |
| 4,880,975 | 11/1989 | Nishioka et al. | 250/306 |
| 4,935,634 | 6/1990 | Hansma et al. | 250/306 |
| 4,943,719 | 7/1990 | Akamine et al. | 73/105 |
| 4,943,720 | 7/1990 | Jones | 250/306 |
| 4,945,235 | 7/1990 | Nishioka et al. | 260/306 |
| 4,947,042 | 8/1990 | Nishioka et al. | 260/306 |
| 4,998,016 | 3/1991 | Nose et al. | 250/306 |
| 5,010,249 | 4/1991 | Nishikawa | 250/306 |
| 5,021,364 | 6/1991 | Akamine et al. | 250/306 |
| 5,051,379 | 9/1991 | Bayer et al. | 250/306 |

FOREIGN PATENT DOCUMENTS

| | | |
|---|---|---|
| 2657623 | 7/1977 | Fed. Rep. of Germany . |
| 0267401 | 10/1989 | Japan ................. 250/306 |
| 1518240 | 7/1978 | United Kingdom . |
| 2238161 | 5/1991 | United Kingdom ........ 250/306 |

OTHER PUBLICATIONS

Kaneko et al., "Ion-Implanted Diamond Tip For a Scanning Tunneling Microscope", Japanese Journal of Applied Physics, vol. 29, No. 9, Sep. 1990, pp. 1854–1855.
"Atomic Force Microscope" Phys. Rev. Lett., vol. 56, No. 9, pp. 930-933, Mar. 3, 1986.
"Atomic Resolution with the Atomic Force Microscope on Conductors and Nonconductors" J. Vac. Sci. Technol. A6(2), pp. 271-274, Mar./Apr. 1988.
"Atomic Force Microscopy of Liquid-Covered Surfaces: Atomic Resolution Images" Appl. Phys. Lett. 51(7), pp. 484–486, Aug. 17, 1987.
"Atomic Resolution Atomic Force Microscopy of Graphite and the Native Oxide on Silicon" J. Vac. Sci. Technol. A6(2), pp. 287-290, Mar./Apr. 1988.
"An Atomic-Resolution Atomic-Force Microscope Implemented Using an Optical Lever" J. Appl. Phys. 65(1), pp. 164-167, Jan. 1, 1989.
Burnham, Nancy A., et al., "Probing the Surface Forces of Monolayer Films with an Atomic-Force Microscope", Physical Review Letters, Apr. 16, 1990, pp. 1931-1934.

*Primary Examiner*—Hezron E. Williams
*Assistant Examiner*—George Dombroske
*Attorney, Agent, or Firm*—Leydig, Voit & Mayer

[57] ABSTRACT

A cantilever for an atomic force microscope includes a diamond stylus for opposing a sample for detecting an atomic force, a stylus holding element, at least a portion of which is made of a magnetic material, holding the diamond stylus, and a lever having a secured end and a free end to which the stylus holding element is fastened for being deformed in response to an atomic force acting between the diamond stylus and the sample. A method of manufacturing a cantilever for an atomic force microscope comprises securing a rough diamond stylus to a stylus holding element, at least a portion of the element being magnetic, forming a stylus by grinding the rough diamond, magnetizing the magnetic stylus holding element, applying an adhesive to the surface of a lever, securing the stylus holding element to the lever with the adhesive therebetween with a magnetic field in the vicinity of the lever, removing the magnetic field from the lever after the adhesive has hardened, and demagnetizing the stylus holding element.

14 Claims, 4 Drawing Sheets

FIG. I
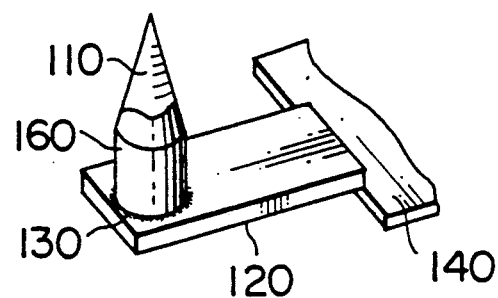
FIG. 2A
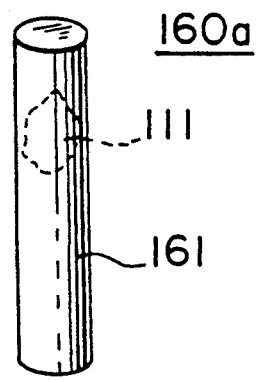
FIG. 2B
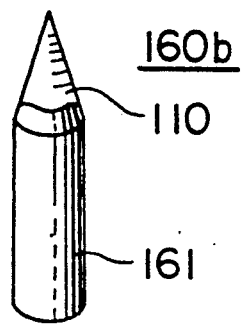

CANTILEVER FOR USE IN ATOMIC FORCE MICROSCOPE AND MANUFACTURING METHOD THEREFOR

BACKGROUND OF THE INVENTION

1. Field of the Invention

The present invention relates to a cantilever for use in an atomic force microscope (to be abbreviated to an "AFM" hereinafter) and a manufacturing method therefor, and, more particularly, to a cantilever using a diamond stylus.

2. Description of the Related Art

Hitherto, as a cantilever for an AFM using a diamond stylus, cantilevers have been disclosed in the following documents:

(1) U.S. Pat. No. 4,724,318,
(2) G. Binnig, C. F. Quate and Ch. Gerber; Phys. Rev. Lett., Vol. 56, No.9, pp.930–933 (1986),
(3) T. R. Albrecht and C. F. Quate; J. Vac. Sci. Technol. A, Vol.6, No.2, pp.271–274 (1988),
(4) O. Marti, B. Drake and P. K. Hansma; Appl. Phys. Lett., Vol.51, No.7, pp.484–486 (1987),
(5) O. Marti, B. Drake, S. Gould and P. K. Hansma; J. Vac. Sci. Technol. A, Vol.6, No.2, pp.287–290 (1988),
(6) S. Alexander, L. Hellemans, O. Marti, J. Schneir, V. Elings, P. K. Hansma, Matt Longmire and John Gurley; J. Appl. Phys., Vol.65, No.1, pp.164–167 (1989)

Cantilevers of the type described above are respectively shown in FIGS. 7 to 9.

A cantilever 100A shown in FIG. 7 is arranged in such a manner that a diamond stylus 110A is secured to an end portion of a lever 120A by an adhesive so that the lever 120A is deflected by a degree corresponding to the atomic force acting between the diamond stylus 110A and a sample (omitted from the illustration). A cantilever 100B shown in FIG. 8 is arranged in such a manner that a diamond stylus 110B is secured to an end portion of a lever 120B, while another end portion of the lever 120B is supported by a supporting portion 140B. A cantilever 100C shown in FIG. 9 is arranged in such a manner that a mirror 150C is fastened to a lever 120C which holds a diamond stylus 110C whereby the deflection of the lever 120C due to the atomic force can be detected by an optical lever.

Since diamond is the hardest material having a Knoop hardness of 5700 to 10400 kgf/mm$^2$ in the (100) plane, its point cannot be easily damaged even if it comes in contact with a sample or the like. Therefore, diamond is the most preferred material for the stylus.

Since each of the above-described cantilevers for use in the AFM must have a characteristic frequency higher than 100 Hz to detect an atomic force of $10^{-8}$ N or lower, its mass must be reduced. For example, in a case where the lever 120A shown in FIG. 7 is made of gold foil, the size of the cantilever 100A necessarily becomes reduced such that the lever 120A is about 25 $\mu$m in thickness, 800 $\mu$m in length and 250 $\mu$m in width and the diamond stylus 110A is a pyramid-like stylus having a side of 100 to 200 $\mu$m. As a result, a problem arises in that it is very difficult to handle the lever and the diamond stylus at the time of manufacturing the cantilever.

Another problem takes place in that the diamond stylus will deviate from a desired position or incline from a predetermined angle while the adhesive, which is used to secure the diamond stylus to the lever, is solidified. Therefore, the quality and the reliability of the cantilever may become unstable, and what is even worse, the manufacturing yield of the cantilever cannot be made satisfactory.

SUMMARY OF THE INVENTION

Accordingly, an object of the present invention is to provide a cantilever for use in an AFM capable of overcoming the above-described problems and revealing excellent quality, satisfactory reliability and high manufacturing yield.

Another object of the present invention is to provide a method of manufacturing a cantilever for use in an AFM revealing the above-described advantage.

An aspect of the present invention lies in a cantilever for an atomic force microscope comprising: a diamond stylus disposed to confront the surface of a sample and detecting atomic force; a stylus holding portion at least a portion of which is made of a magnetic material and which holds the diamond stylus; and a lever having one end which is secured and another end to which the stylus holding portion is fastened, the lever being deformed in accordance with the atomic force acting between the diamond stylus and the sample.

Another aspect of the present invention lies in a method of manufacturing a cantilever for an atomic force microscope comprising the steps of: securing a rough diamond to a stylus holding portion at least a portion of which is made of magnetic substance; forming a stylus by grinding the rough diamond; magnetizing the magnetic substance of the stylus holding portion; applying an adhesive to the surface of a lever; securing the stylus holding portion to the lever where the adhesive is applied by a magnetic force generated by a magnet disposed in the vicinity of the lever; and removing the magnet from the lever after the adhesive has hardened and the magnetic substance of the stylus holding portion is demagnetized.

In the cantilever according to the present invention, the stylus holding portion, at least a portion of which is made of a magnetic substance, supports the diamond stylus on the lever.

According to the method of manufacturing the cantilever of the present invention, the magnetic substance of the stylus holding portion for holding the diamond stylus is magnetized and the stylus holding portion is secured by magnetic force to the surface of the lever on which the adhesive has been applied. Then, the adhesive is hardened.

The cantilever according to the present invention is fastened to the AFM so that the diamond stylus performs an XY scanning parallel to the surface of a sample in accordance with the movement of the cantilever or the movement of the sample to be observed, the sample being placed opposite the point of the stylus. At this time, the lever is deformed by the force acting between atoms at the surface of the sample and atoms at the tip of the diamond stylus. This deformation causes displacement in Z-direction, perpendicular to the sample surface, i.e., a change in the angle of the lever is produced, the change being corresponding to the above-described displacement.

The Z-directional displacement of the lever can be detected by, for example, a scanning tunneling microscope (STM) in such a manner that a probe is brought closer to the surface of the lever opposing the side on which the diamond stylus is fastened. As an alternative to this, the displacement is detected in accordance with the deviation of an optical path of a list beam incident upon the surface of the lever, the optical path being altered in accordance with the angular change of the lever which corresponds to the Z-directional displacement.

BRIEF DESCRIPTION OF THE DRAWINGS

FIG. 1 is a perspective view which illustrates a first embodiment of a cantilever for use in an AFM according to the present invention;

FIGS. 2A to 2E sequentially illustrate a process for manufacturing the cantilever according to the first embodiment of the present invention;

DESCRIPTION OF THE PREFERRED EMBODIMENTS

Figure 2C:
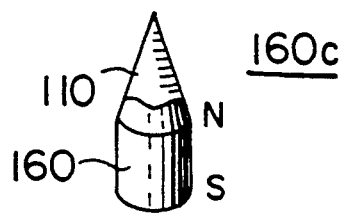

Preferred embodiments of the present invention will now be described with reference to the drawings.

Referring to FIG. 1, a cantilever 100 according to a first embodiment of the present invention comprises: a lever 120 an end portion of which is supported by a lever supporting portion 140; a stylus holding portion 160 secured to another end portion of the lever 120 by an adhesive 130; and a diamond stylus 110 a portion of which is embedded in the stylus holding portion 160. The lever 120 is arranged in such a manner that its end portion supported by the lever supporting portion 140 serves as the fixed end and the end portion to which the stylus holding portion 160 is secured serves as the free end. As a result, the lever 120 is deformed by a degree corresponding to the magnitude of the atomic force acting between the diamond stylus 110 and a sample (omitted from the illustration).

The diamond stylus 110 is made of natural or artificial diamond having a sharp point necessary to detect the atomic force. For example, the point has a curvature radius of 0.5 μm or less.

The stylus holding portion 160 secures the diamond stylus 110 in such a manner that it surrounds and holds a portion of the diamond stylus 110, the stylus holding portion 160 being made of a material prepared by sintering powder of a magnetic substance such as nickel (Ni), iron (Fe) or their alloy. The above-described stylus holding portion 160 has been demagnetized in the manufacturing of the completed cantilever 100.

The lever 120 is made of a non-magnetic material having proper rigidity such as gold (Au), platinum (Pt), tungsten (W), molybdenum (Mo) or silicon (Si). It is preferable that the lever 120 have a width of 250 to 300 μm, a thickness of 10 to 20 μm and a length of 500 to 800 μm.

It is preferable that the adhesive 130 is made of cyanoacrylate revealing a significantly short setting time or a material prepared by combining an epoxy resin having thixotropic characteristics for preventing fluid leakage and an aromatic amine setting agent.

The cantilever 100 thus constituted is fastened to the AFM in such a manner that an end portion of the lever 120 is supported by the lever supporting portion 140 by spot welding or using the adhesive, the lever supporting portion 140 being then fastened to a predetermined position of the AFM. The shape and the dimensions of the lever supporting portion 140 are not limited if the cantilever 100 is able to desirably act as a component of the AFM. Furthermore, the lever supporting portion 140 may be made of the same material as that for the lever 120 while arranging the structure in which a portion of the lever 120 is extended.

In a case where the cantilever 100 comprises the lever 120 having a width of 280 μm, a thickness of 10 μm and a length of 750 μm, the stylus holding portion 160 having a diameter of 250 μm and a length of 300 μm and a conical diamond stylus 110 having the bottom portion the diameter of which is 250 μm and a height of 200 μm, the spring constant k of the cantilever 100 is 90 N/m and the resonant frequency of the same is 6 kHz.

Then, a method of manufacturing the cantilever 100 arranged as described above will be described with reference to FIGS. 2A to 2E. First, powder of the magnetic substance and a rough diamond are set in a mold (omitted from the illustration) before pressure has been applied so that they are formed in a cylindrical shape. The thus obtained cylindrical material is heated so as to sinter the powder of the magnetic substance. As a result, a cylindrical material 160a as shown in FIG. 2A is manufactured. The powder of the magnetic substance becomes a sintered body 161 so that it strongly adheres to the rough diamond 111. The powder of the magnetic substance can be sintered by known sintering technology which has been used to sinter the metal powder or the like.

Then, the outer surface and the edge of the cylindrical material 160a are ground while grinding the edge of the rough diamond 111. As a result, a stylus rod 160b can be formed in which the diamond stylus 110 is held at the front portion of the sintered body 161. The above-described stylus rod 160b can be manufactured by known technology employed for grinding a jewel. For example, the cylindrical material 160a is lap-polished by using a copper wheel bearing diamond dust while swinging the cylindrical material 160a so that the rough diamond 111 is exposed and is simultaneously sharpened. Thus, the stylus rod 160b can be obtained which comprises the sintered body 161 the diameter of which is 200 to 300 μm and the conical diamond stylus 110 the top angle of which is 45° to 65° and the radius of curvature of the tip of which is 0.5 μm or less.

Then, the sintered body 161 is cut to have a predetermined length, for example, 300 to 500 μm by a cutter (omitted from illustration) which employs a diamond impregnated wheel or a diamond wire. As a result, the above-described sintered body 161 is made to be the stylus holding portion 160 as shown in FIG. 2C. Furthermore, the stylus holding portion 160 is magnetized so that a stylus bar magnet 160c which is a permanent magnet is manufactured.

Figure 2D:
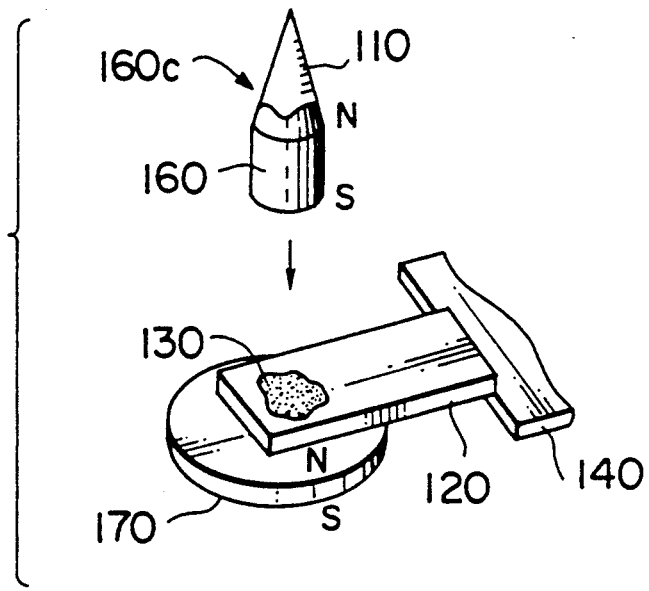
Figure 2E:
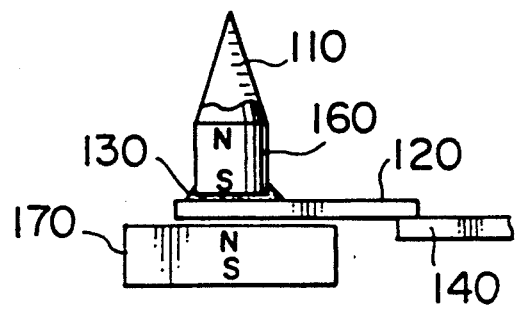

Then, a slight quantity of the adhesive 130 is, as shown in FIG. 2D, applied to the free end portion of the lever 120. In addition, a permanent magnet 170 is placed below the lever 120 to which the adhesive 130 has been applied. The permanent magnet 170 is disposed in such a manner that its polarity corresponds to the polarity of the stylus bar magnet 160c so as to make the diamond stylus 110 of the stylus bar magnet 160c face upwards due to the magnetic force acting between the permanent magnet 170 and the stylus bar magnet 160c. Then, the stylus holding portion 160 is placed on the surface of the lever 120 to which the adhesive 130 has been applied while being attracted by a portion of the stylus bar magnet 160c adjacent to the diamond stylus 110 by using, for example, a vacuum tweezer (omitted from the illustration) made of a non-magnetic material. After the above-described placement has been ended, the stylus bar magnet 160c is removed from the vacuum tweezer. At this time, the stylus bar magnet 160c is, as shown in FIG. 2E, reliably secured to the lever 120 via the adhesive 130 by the attracting force acting between the stylus bar magnet 160c and the permanent magnet 170 disposed below the lever 120. The above-described state is continued until the adhesive 130 is completely set.

After the adhesive 130 has been set, the permanent magnet 170 is removed, and the stylus holding portion 160 is demagnetized by using a demagnetizer (omitted from the illustration) which utilizes an alternating magnetic field. As a result, the cantilever 100 shown in FIG. 1 is manufactured.

As described above, according to this embodiment, the stylus bar magnet 160c and the lever 120 are secured by the magnetic force before the completion of setting of the adhesive agent 130. Furthermore, the diamond stylus 110 is made to face in a direction determined by the polarity of the stylus bar magnet 160c and the permanent magnet 170. Therefore, the problem that the diamond stylus 110 is deviated from a predetermined position or inclined undesirably during the setting of the adhesive 130 can be perfectly prevented. As a result, the quality and the reliability of the cantilever can be improved. Furthermore, the manufacturing yield of the cantilever can be significantly improved.

The above-described work in which a fine substance is handled by utilizing the attracting/separating action of the vacuum tweezer is an ordinary operation performed in the semiconductor industry. Therefore, the above-described work in which the stylus holding portion 160 is placed on the adhesive 130 while attracting the portion of the stylus bar magnet 160c adjacent to the diamond stylus 110 by using the vacuum tweezer can be easily performed. According to the present invention, the vacuum tweezer may be replaced by a DC excitation electromagnet in the form of a tweezer or a hairpin shape. In this case, the stylus bar magnet 160c can be carried or positioned and aligned while making the diamond stylus 110 face upwards by the excitation/non-excitation of the electromagnet. Furthermore, the permanent magnet 170 disposed below the lever 120 may be moved to align the position of the lever 120 to that of the stylus bar magnet 160c.

Figure 3:
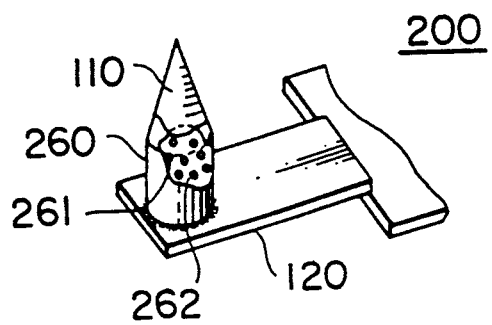
FIGS. 3 to 6 are perspective views which respectively illustrate second to fifth embodiments of the present invention.

FIG. 3 illustrates a second embodiment of the cantilever according to the present invention.

A cantilever 200 according to this embodiment is arranged in such a manner that a stylus holding portion 260 for holding the diamond stylus 110 is made of hardened plastic resin 262 in which a magnetic powder 261 is dispersed. That is, a portion of the diamond stylus 110 is embedded in a mixed body of the magnetic substance powder 261 and the hardening plastic resin 262 so that the same is secured by the hardened plastic resin 262. As the magnetic substance powder 261, for example, nickel (Ni), iron (Fe), their alloy or barium ferrite (BaO.6-Fe$_2$O$_3$) powder is used. As the hardening plastic resin 262, phenol resin or polyimide resin which reveals excellent heat resistance is used.

The cantilever 200 according to this embodiment can be manufactured similarly to the method of manufacturing the cantilever according to the first embodiment shown in FIGS. 2A and 2E. Since the compression and heating process such as the sintering process can be eliminated in this embodiment, the cylindrical material 160a as shown in FIG. 2A can be easily manufactured.

Figure 4:
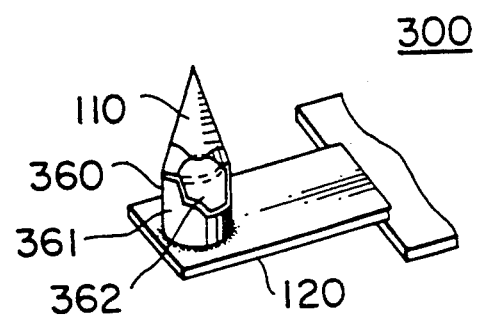

FIG. 4 illustrates a third embodiment of the cantilever according to the present invention.

In a cantilever 300 according to this embodiment, a stylus holding portion 360 comprises a thin tube 361 made of a magnetic substance and hardened plastic resin 362 disposed in the thin tube 361. A portion of the diamond stylus 110 is embedded in the thin tube 361 so as to be secured by the plastic resin 362. The thin tube 361 is made of, for example, nickel (Ni). The cantilever 300 according to this embodiment is manufactured by, first, charging the thin tube 361 with a rough diamond and the plastic resin 362, the plastic resin 362 being then hardened. Then, the rough diamond is ground so that the diamond stylus 110 is formed. As a result, the stylus rod is formed. Then, similar to the processes according to the first embodiment shown in FIGS. 2C to 2E, the cantilever 300 can be manufactured. In this case, the thin tube 361 is magnetized at the time of forming the stylus bar magnet. According to this embodiment, since the thin tube 361 has predetermined inner and outer diameters, the process of grinding the cylindrical material can be eliminated.

Figure 5:
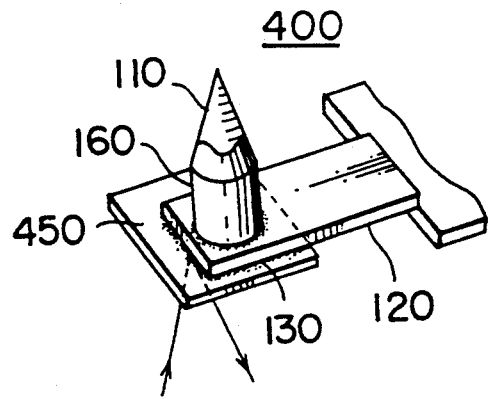

FIG. 5 illustrates a fourth embodiment of the cantilever according to the present invention.

A cantilever 400 according to this embodiment is arranged in such a manner that the stylus holding portion 160 is disposed on the top surface at the free end portion of the lever 120 while a mirror 450 is secured to the bottom surface thereof. The lever 120, the mirror 450 and the stylus holding portion 160 are secured to one another by the adhesive 130. In the cantilever 400, the deflection of the lever 120 due to atomic force can be detected by utilizing a so-called optical lever in such a manner that the reflection angle of an optical beam incident upon the mirror 450 is detected.

The cantilever 400 according to this embodiment is manufactured in such a manner that the lever 120 is interposed between the mirror 450 and the stylus holding portion 160 via the adhesive 130. Furthermore, this state is maintained by the magnetic force acting between the permanent magnet 170 and the stylus holding portion 160 similarly to the manufacturing process shown in FIG. 2E before the adhesive 130 is hardened. As a result, stylus holding portion 160 and the mirror 450 can simultaneously be fastened to the lever 120 while preventing positional deviation.

Figure 6:
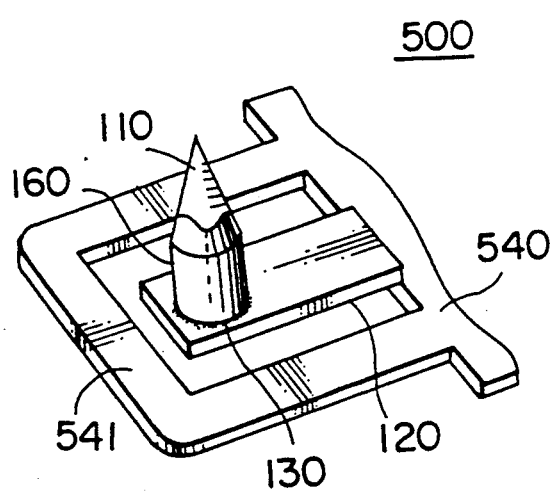
Figure 7:
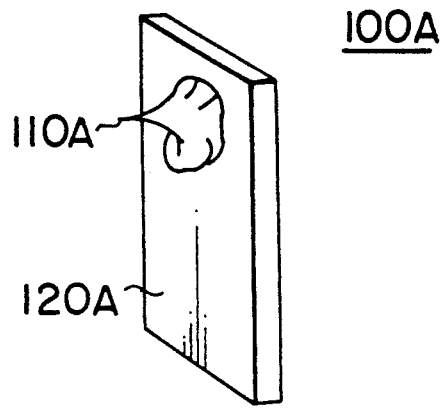
FIGS. 7 to 9 are perspective views which respectively illustrate conventional cantilevers for use in the AFM.
Figure 8:
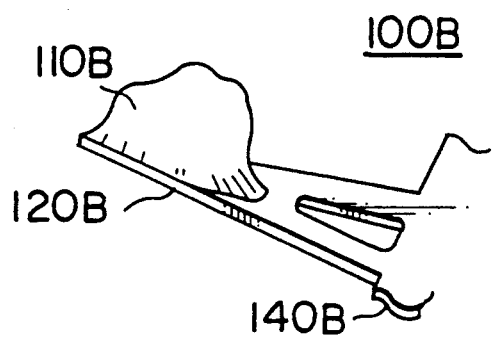
Figure 9:
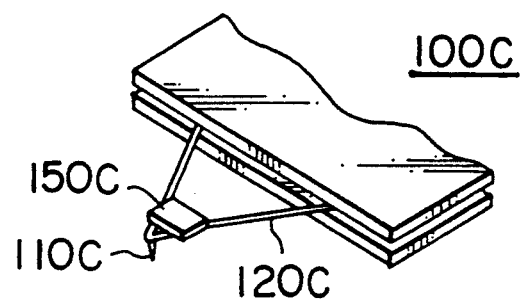

FIG. 6 illustrates a fifth embodiment of the cantilever according to the present invention.

A cantilever 500 according to this embodiment is arranged in such a manner that a fixed end of the lever 120 is supported by a lever supporting portion 540. The lever supporting portion 540 is provided with a lever protection portion 541 surrounding the free end of the lever 120. The lever protection portion 541 is, for example, arranged in such a manner that a portion of the lever supporting portion 540 projects. According to this embodiment, undesirable deformation of the lever 120 which would take place due to contact with an external substance at the time of using the cantilever 500 is prevented by the lever protection portion 541. The lever protection portion 541 is made of a material revealing sufficient strength and tenacity such as phosphor bronze. Although the lever protection portion 541 shown in FIG. 6 is formed by projecting a portion of the cantilever supporting portion 540, another structure may be employed in which a lever protection portion is manufactured from a material revealing strength and tenacity, separately from a lever supporting portion, the lever protection portion being secured to the lever supporting portion by spot welding or an adhesive.

What is claimed is:

1. A cantilever for an atomic force microscope comprising:
   a diamond stylus for opposing a sample for detecting an atomic force;
   a stylus holding portion, at least a portion of which is a demagnetized magnetizable material, holding said diamond stylus; and
   a lever having two opposed ends, one end being secured and another end to which said stylus holding portion is fastened being free, for deforming in response to an atomic force acting between said diamond stylus and the sample.

2. A cantilever for an atomic force microscope according to claim 1 wherein said stylus holding portion is a sintered body of a magnetic powder.

3. A cantilever for an atomic force microscope according to claim 1 wherein said stylus holding portion is a plastic resin in which a magnetizable powder is dispersed.

4. A cantilever for an atomic force microscope according to claim 1, wherein said stylus holding portion comprises a thin tube of magnetizable tube and plastic resin filling said thin tube.

5. A cantilever for an atomic force microscope according to claim 1 comprising a mirror secured to the free end of said lever for detecting deformation of said lever.

6. A cantilever for an atomic force microscope according to claim 1 comprising a lever protection portion which is connected to the secured end of said lever and surrounds the portion around the free end of said lever.

7. A cantilever for an atomic force microscope according to claim 1 wherein said magnetizable material is one of nickel, iron and an alloy thereof.

8. A cantilever for an atomic force microscope according to claim 1 wherein said lever non-magnetic.

9. A cantilever for an atomic force microscope according to claim 1 comprising a lever supporting member connected to the secured end of said lever and supporting said lever.

10. A cantilever for an atomic force microscope according to claim 1, wherein said diamond stylus has a conical shape.

11. A cantilever for an atomic force microscope according to claim 3 wherein said plastic resin is one of phenol resin and polyimide resin.

12. A cantilever for an atomic force microscope according to claim 4 wherein said thin tube is nickel.

13. A cantilever for an atomic force microscope according to claim 9 including a lever protection portion that is a portion of said lever supporting member.

14. A cantilever for an atomic force microscope according to claim 13 wherein said lever protection portion is phosphor bronze.

* * * * *

UNITED STATES PATENT AND TRADEMARK OFFICE
CERTIFICATE OF CORRECTION

PATENT NO. : 5,193,385

DATED : March 16, 1993

INVENTOR(S) : Nishioka et al.

It is certified that error appears in the above-identified patent and that said Letters Patent is hereby corrected as shown below:

Claim 4, col. 7, line 28, delete "tube of";

Claim 4, col. 7, line 28, after "and" insert --a--.

Claim 7, col. 8, line 10, after "iron" insert --,--.

Signed and Sealed this

Thirtieth Day of November, 1993

Attest:

BRUCE LEHMAN

Attesting Officer

Commissioner of Patents and Trademarks